United States Patent [19]
Civanlar

[11] Patent Number: 5,944,795
[45] Date of Patent: *Aug. 31, 1999

[54] CLIENT-SERVER ARCHITECTURE USING INTERNET AND GUARANTEED QUALITY OF SERVICE NETWORKS FOR ACCESSING DISTRIBUTED MEDIA SOURCES

[75] Inventor: Mehmet Reha Civanlar, Middletown, N.J.

[73] Assignee: AT&T Corp., New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/678,915

[22] Filed: Jul. 12, 1996

[51] Int. Cl.⁶ .................................................. H04L 12/66
[52] U.S. Cl. .......................... 709/227; 709/218; 709/249
[58] Field of Search ....................... 395/200.47, 200.48, 395/200.79, 200.57, 200.58; 379/100.12; 455/4.2; 370/401; 709/218, 227, 249

[56] References Cited

U.S. PATENT DOCUMENTS

| | | |
|---|---|---|
| 4,893,306 | 1/1990 | Chao et al. . |
| 5,007,017 | 4/1991 | Kobayashi . |
| 5,014,266 | 5/1991 | Bales et al. . |
| 5,029,200 | 7/1991 | Haas et al. ................................. 379/89 |
| 5,181,236 | 1/1993 | La Valee et al. .......................... 379/67 |
| 5,247,347 | 9/1993 | Litteral et al. .............................. 348/7 |
| 5,333,266 | 7/1994 | Boaz et al. .............................. 379/200 |
| 5,448,626 | 9/1995 | Kajiya et al. .............................. 379/67 |
| 5,510,923 | 4/1996 | Philippe et al. . |
| 5,557,317 | 9/1996 | Nisho et al. ................................. 348/7 |
| 5,596,574 | 1/1997 | Perlman et al. ......................... 370/389 |
| 5,608,786 | 3/1997 | Gordon .................................... 370/352 |
| 5,610,910 | 3/1997 | Focsaneanu et al. .................... 370/351 |
| 5,689,553 | 11/1997 | Ahuja et al. ............................. 379/202 |
| 5,838,682 | 11/1998 | Dekelbaum et al. .................... 370/401 |

OTHER PUBLICATIONS

"The Voice of Technology", Credit World, Jul. 1994, vol. 82, No. 6, pp. 20–23, by Kuehn, Richard A.

Telecommunications Buyers Guide & Directory, Editor & Publisher Inc., Feb. 12, 1994, vol. 127, No. 7 pp. 29TC–38TC.

"New Products Add Interactive Voice–Response to Web Sites," Interactive Marketing News (Mar. 15, 1996) vol. 3, No. 6.

"Multi Call: Web Call—A Real Virtual Call Centre" M2 Presswire, Nov. 27, 1995.

materials printed from pointcast.com World Wide Web Site.

Primary Examiner—Meng-Ai T. An
Assistant Examiner—Walter D. Davis, Jr.
Attorney, Agent, or Firm—Kenyon & Kenyon

[57] ABSTRACT

An improved client-server architecture of the present invention utilizes the advantages of known QOS networks to provide guaranteed quality of service, security, and a charge mechanism for handling requests initiated over a packet network, such as the Internet, for access to distributed media sources. Such media sources may be independent of the QOS network provider and may be located by browsing the Internet. A method of operating a client-server network enables the system level merger of the Internet and a guaranteed QOS network, such as the public switched telephone network, in order to provide the users with a complete information superhighway today. It will appear to the average user that the Internet and the QOS network are fused together. Thus, when a user, connected to the Internet, selects an application that requires functionalities offered by the telephone network, such as guaranteed QOS delivery of media information or customized billing, the Internet-resident application will communicate information to a server, which will in turn initiate a session over the QOS network for delivery of the required information to the client using client information transmitted from the client (or from the application) to the server over the established Internet session. The client information may include a client account number, login and password, and/or phone number to enable the server to establish the switched network connection to the client. Accordingly, media sources which are separate and independent from the QOS network provider may be accessed using a secure, guaranteed QOS network in a manner providing for ease of identification and billing.

43 Claims, 1 Drawing Sheet

CLIENT-SERVER ARCHITECTURE USING INTERNET AND GUARANTEED QUALITY OF SERVICE NETWORKS FOR ACCESSING DISTRIBUTED MEDIA SOURCES

The present application is related to U.S. application Ser. No. 08/402,664 entitled Client-Server Architecture Using Internet and Public Switched Networks, filed Mar. 13, 1995, now abandoned and to U.S. application Ser. No. 08/648,260 entitled Multimedia Information Service Access, filed on May 15, 1996 now abandoned. These three applications are co-pending and commonly assigned.

TECHNICAL FIELD

This invention relates to the Internet network and, more particularly, provides an improved client-server architecture utilizing a packet network, such as the Internet, and a guaranteed quality of service network, such as the public switched network, for access to distributed media sources.

BACKGROUND OF THE INVENTION

The Internet's global and exponential growth is common knowledge today. The Internet is implemented using a large variety of connections between millions of computers. Internet access is readily available to individuals across the globe. Various on-line service providers, such as America Online, CompuServe, Prodigy, Netcom, etc., use PSTN with modems or ISDN adapters for client connections. These on-line service providers maintain servers on the Internet providing client access to the Internet.

The recent developments on the World Wide Web user interfaces and information navigation software such as the Netscape web browser, coupled with a continuously growing number of public access providers, are making the Internet a fundamental component of the information age, if not the information super highway itself. World Wide Web sites on the Internet are typically accessible through a browser program which interprets scripts written in Hyper Text Markup Language (HTML). Users may browse the World Wide Web for virtually any kind of information, including information having content derived from one or more media, such as words, sounds or images. It is desired to enable the on-demand access to a variety of sources of media information using the Internet.

On the other hand, it is also well known that the current Internet is deficient, as compared to other existing networks, in the following three fundamental functionalities expected from a complete information network: 1) quality of service (QOS), 2) security, and 3) an easy and flexible mechanism to charge for the information and transmission services. These deficiencies discourage not only media providers from providing real-time on-demand access to media source information over the Internet, but also users who might otherwise desire to purchase real-time on-demand access to information held by such media sources. Although recent developments in the Internet Protocol (IP) and in Internet applications show promise for providing tools for secure transmission and real-time support, without a globally-agreed and implemented billing mechanism, guaranteed QOS over a global network is not possible. Consequently, none of these mechanisms can provide reliable, real-time global transmission employing the Internet today. One such service which may not be adequately provided by the Internet would be a request for delivery of a long video or audio segment. It may not be possible to have a guaranteed real-time delivery of such a long video and audio segment because one or more of the routers or computer links in the Internet may be busy handling other requests.

The existing telephone networks, on the other hand, have been offering the capabilities of guaranteed quality of service, security, and an easy and flexible mechanism to charge for the information and transmission services for a long time; the level of QOS, security and ease and flexibility of billing provided by existing telephone networks clearly surpasses the levels of these functions afforded by the Internet. What is desired is a practical way to utilize these advantages to provide guaranteed quality of service, security, and a charge mechanism for handling requests to access media sources that may be located by browsing the Internet.

Pending U.S. application Ser. No. 08/402,664 and U.S. application Ser. No. 08/648,260 have recognized these shortcomings of the Internet and the advantages of using a QOS network, such as the public switched telephone network, in tandem with the Internet to provide guaranteed quality of service, security and an easy and flexible billing mechanism. The present invention utilizes these advantages to enhance access to distributed media sources that are unbundled from or separate from the server architecture.

SUMMARY OF THE INVENTION

An object of the improved client-server architecture of the present invention is to utilize the advantages of known QOS networks to provide enhancements in functions, such as quality of service, security, and billing, for handling requests initiated over a packet network, such as the Internet, for on-demand access to distributed media sources. Such media sources may be independent of the QOS network provider.

In accordance with the present invention, a method of operating a client-server network enables a system level merger of a packet network, such as the Internet, and a guaranteed QOS network, such as the public switched telephone network, in order to provide the users with a complete information superhighway today. As the present invention will make it appear to the average user that the packet network and the QOS network appear to be fused together, the present invention will be referred to from time-to-time as "FusionNet."

When a user engaged in an Internet session selects an application that requires enhanced functionalities offered by the telephone network, such as guaranteed QOS delivery of media information or customized billing, the Internet-resident application will communicate information to a FusionNet server, which will in turn initiate a communications session for on-demand delivery of the required information to the client over the QOS network using client information transmitted from the client (or from the application) to the server. The client information may include a client account number, login and password, and/or phone number to enable the server to establish the switched network connection to the client. Billing for service and transmission may proceed as in a normal or collect telephone call. There is no security problem or complicated identification mechanism. Also, because of the built-in security of the telephone networks, FusionNet's guaranteed QOS path does not require a firewall between the client and the outside-world in order to avert unauthorized access.

Accordingly, media sources which are separate and independent from the QOS network provider may be accessed using a secure, guaranteed QOS network in a manner providing for ease of identification and billing.

DETAILED DESCRIPTION

The Internet is a dynamic packet network consisting of millions of interconnected computers which could run several applications, such as the World Wide Web. Web browsers such as the one by Netscape are programs using a graphical user interface that provides a user easy access to various services over the Internet. The present invention enables the above-identified functionality of a QOS network, such as the public switched network, to be combined with the Internet functionality to enhance services provided by existing Internet applications and to create new ones.

The present invention provides a seamlessly integrated system that makes it possible to use a packet network, such as the Internet, together with a QOS network that offers functions such as 1) quality of service, 2) security and 3) an easy and flexible charging mechanism at an enhanced level (as compared with the packet network). The QOS network may be a known switched network, such as the public switched telephone network (PSTN), the integrated services digital network (ISDN), an asynchronous transmission network (ATM), a cable network used for video or television programs, etc., or it may also be private or corporate communication or data network as long as it provides enhancements in at least one of the three functionalities described above.

Figure 1:
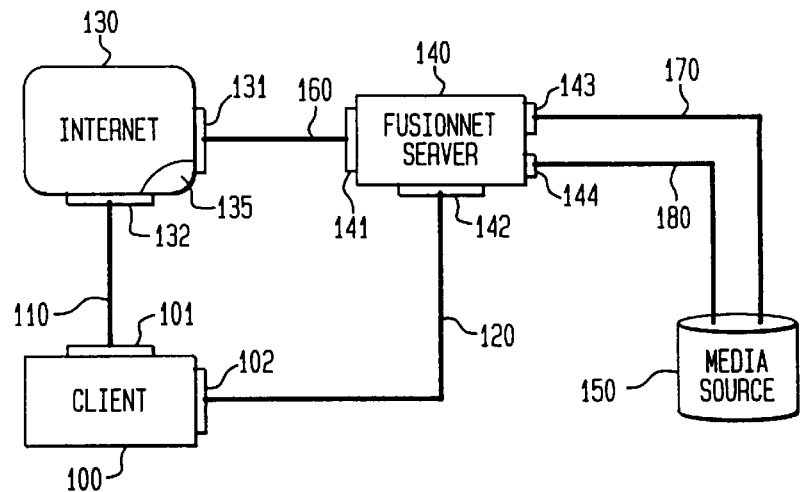
FIG. 1 shows an illustrative client-server architecture using both the Internet and a guaranteed QOS network in accordance with an embodiment of the present invention.

A high level block diagram for a FusionNet services architecture is shown in FIG. 1. With reference to FIG. 1, the system is based on a client-server architecture, where the client apparatus 100 may be either a personal computer (PC), a single workstation or two such systems which can be operated in a coordinated manner (e.g., physically close systems, users who talk over the telephone, etc.). The key factor is that each client station 100 requires two logical network connections or interfaces, e.g., 101 and 102. One of these interfaces 101 provides a connection to the Internet 130 which can be made through one of a number of known channels, e.g., a local area network (LAN) connection, a Serial Line Internet Protocol (SLIP) or Point-to-Point Protocol (PPP) connection over a modem or over an ISDN port. These connections are made through network 110 which may be either a private connection or the public switched telephone network. The second interface 102 provides a connection to guaranteed QOS network 120, e.g., a public or private switched telephone network, which may also be made through a modem, an ISDN port, or via a connection to a special LAN such as an ATM LAN or a LAN that offers bandwidth reservations.

It should be noted that these two interface connections 101 and 102 are defined at the logical level, that is, client apparatus 100 may have a single physical connection (i.e., modem, ISDN adapter, etc.) that can be used to attach it to both the Internet 130 and the guaranteed QOS network (e.g., public switched network) 120. For example, a modem with "Call Waiting" functionality, an ISDN line used as two separate B channels, an ATM LAN connection where the PSTN connection can be accomplished through a bridge, or a video telephony connection conforming to the CCITT H.320 standard which provides Internet connectivity over its data channel can provide the required two logical connections over a single physical connection.

Similarly, a FusionNet server 140 has access to both Internet 130 and the QOS network 120 via logical network interfaces 141 and 142. A FusionNet server 140 may be a computer or other software-driven machine having processing capability for carrying out the server functions herein described, or it may be a software package that includes those server functions and that operates on a computer or other software-driven machine. Generally, the system of FIG. 1 enables a plurality of client computer-based apparatuses 100 to access a plurality of FusionNet servers 140 via Internet 130 and QOS network 120. Typically, access to the Internet is made through a logical network interface 132. Typically, access by a client apparatus 100 to FusionNet server 140 via the Internet 130 utilizes the HyperText Transport Protocol (HTTP) which is accessed using a browser application program available at the client apparatus 100.

A general overview of the operation of the present invention is as follows. A user at a client apparatus 100 connects to Internet 130 and requests an access to media information requiring enhanced functionalities not available on Internet 130, but offered by QOS network 120. Illustratively, an enhanced service request would be one requesting a guaranteed QOS delivery, security, or customized charging. Providing such enhanced Internet services would enable the delivery over the switched network of 1) real-time video transmission, 2) real-time, high quality audio transmission, or 3) immediate access to sensitive data such as stock market data, as just three examples. The user may locate such desired media information by, for example, browsing the Internet and locating references to one or more media sources at a variety of World Wide Web sites. World Wide Web sites on the Internet are typically accessible through a browser program. As an example, a World Wide Web site could contain information about one or more media sources, such as the type of media (e.g., music, text, images, or movies), available selections (e.g., a list of movies by title and lead performers), and pricing information. Alternatively, other information sources available over the Internet (e.g., a USENET newsgroup posting) could provide information about a media source.

Upon locating a desired media source 150 by browsing a World Wide Web site 135, the user selects access to the media source 150 by clicking on a reference point contained in Web site 135, which in turn initiates a program to establish a communications session between Internet 130 and FusionNet server 140 using network 160 and logical network interfaces 131 and 141. During this process a program running from Web site 135 may request information about the client, for example the client's telephone number, a login name and password, or an account number. The client information along with information identifying the selected media source is then passed along to FusionNet server 140 over communications path 160. Functions such as these may be implemented using the well-known Common Gateway Interface (CGI) for which public software implementations are available for HTTP-compatible servers using common computer communications interfaces such as sockets. The CGI is a publicly-documented open interface with a specification that can be readily obtained from the Internet. For example, an Internet World Wide Web site maintained by the National Center for Supercomputing Applications at the University of Illinois at Urbana- Champaign contains a description of CGI and its specification as well as a CGI program archive.

FusionNet server 140 then undertakes to establish a communications session with the selected media source 150, utilizing network 170 and logical network interface 143, for purposes of controlling the selection and delivery of media information available through the media source. An address for the media source, if necessary, may be provided by the Web site 135 or stored by the FusionNet server 140. Communications path 170 can be any one of a number of known communications channels, e.g., a private communications network, the PSTN, or even the Internet. Once a communications session is established between FusionNet server 140 and selected media source 150, FusionNet server 140 could then query the selected media source for availability of the desired media information.

After FusionNet server 140 establishes the communications session with selected media source 150 over communications path 170, the server 140 then initiates a communications session over a QOS network 120 with the client 100. This communications session may be established, for example, by initiating a call connection over the public switched network using a telephone number provided by the client 100 as part of the service request. Several programs for automatic dialing of PSTN or ISDN numbers are available for various computers (e.g., PictureTel™ PCS series) and can be used for this purpose. Client apparatus 100 would include a program that accepts incoming phone calls. Such software is also available from many vendors (e.g., PictureTel™ PCS series). Such a call may be billed by any of the standard call billing methods e.g., collect or third party billing, etc. The QOS network 120 chosen for the communications session provides the billing for the service and transmission, as well as enhanced security, and complicated identification mechanisms are not needed. In a typical application or service request between a client and server, both the Internet and QOS network connection may coexist, or the Internet session may be discontinued. Another possibility is to use an already established client account for billing purposes.

The actual transaction, e.g., security checks and sending a file or audio/video data over the QOS connection, can then be handled by the same process or yet another process. FusionNet server 140 completes the QOS connection between the client 100 and the selected media source 150 by establishing communications session over path 180 between the server 140 and media source 150. Communications path 180 may also be made using the PSTN, or ISDN network, or another QOS network. FusionNet server 140 then causes the media source to transfer media information to client 100 over the QOS connection, and server 140 can retain control over the transfer process by causing media source 150 to, e.g., stop, pause, or retransmit the requested media information.

Figure 2:
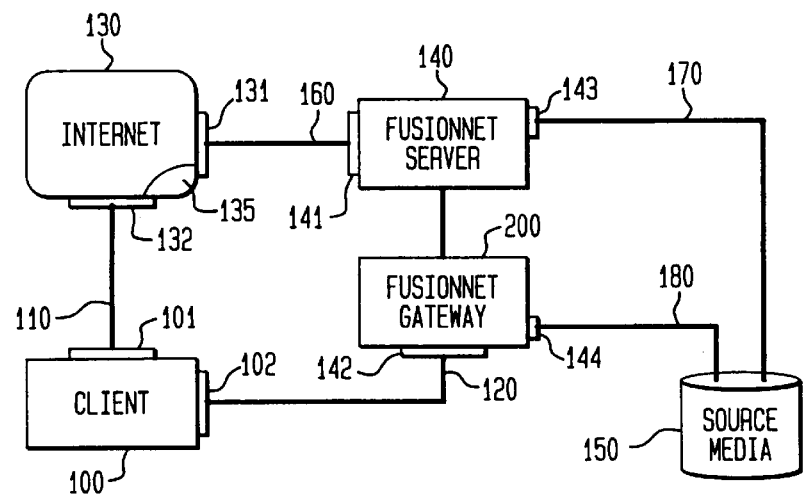
FIG. 2 shows another depiction of an illustrative client-server architecture using both the Internet and a guaranteed QOS network connected to a media source through a gateway in accordance with the present invention.

Typically, QOS network connections 120 and 180 will be of a common type (e.g., each PSTN) such that FusionNet server 140 may simply implement a switched connection of the two QOS network connections providing a therefore a single connection between client 100 and media source 150 to permit transfer of media information from the source 150 to client 100. It will be obvious to one skilled in the art that the media information could be transferred, subject to the control of FusionNet server 140, from media source 150 to client 100 over a QOS network directly connected between source 150 and client 100 without routing the media information through FusionNet server 140.

Where the transfer of information through network 120 and network 180 requires more than just a simple switching operation, e.g., data conversion or data reformatting is required, a FusionNet gateway 200 as shown in FIG. 2 operates to transfer media information from source 150 to client 100. All of the other elements in FIG. 2 are the same as those in FIG. 1, and therefore bear the same reference numerals. Once the QOS gateway connection is established, FusionNet server 140 instructs media source 150 to transmit the desired media information to client 100. The FusionNet gateway 200 may, if necessary, translate or reformat the information as it is transferred from source 150 to client 100. Gateway 200 may, alternatively, adjust to the client's information protocol. At the end of the transaction, the QOS gateway connection may be dropped. FusionNet server 140 may then complete any remaining billing procedures for the transfer.

Figure 3:
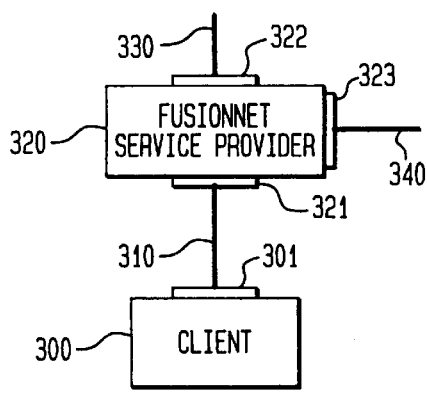
FIG. 3 shows a variation of the client-server architecture in which a client connects to the Internet and to the FusionNet server through a service provider in accordance with the present invention.

A variation of the architecture described above may be derived by shifting the client connection functionality to a FusionNet service provider as shown in FIG. 3. The client makes a single connection to the FusionNet service provider which, in turn, would implement the two logical connections for the Internet and the QOS network connection to the FusionNet server, respectively. This has the advantage of providing a client access to the FusionNet architecture by making only a single physical connection which may reduce the complexity of client apparatus as well as remove the need for the client to coordinate two logical connections. Referring to FIG. 3, a user at client station 300 establishes a connection 310 with FusionNet service provider 320. Connection 310 is a point-to-point connection made using logical interfaces 301 and 321 through a QOS network that may be one of the known channels such as the PSTN, or ISDN or a private telephone network.

In this variation of the client-server architecture, FusionNet service provider 320 has the capability of establishing communications sessions with the Internet and with a FusionNet server that are functionally equivalent to the sessions among the client, the Internet and the FusionNet server described above with reference to FIGS. 1 and 2. In FIG. 3, a communications session is established between the FusionNet service provider and the Internet using communications path 330 and logical interface 322, which correspond to path 110 and logical interface 101 shown, respectively, in FIGS. 1 and 2. Similarly, in FIG. 3 a communications session between the FusionNet service provider and the FusionNet Server is established using path 340 and logical interface 323, which correspond to path 120 and logical interface 102 shown, respectively, in FIGS. 1 and 2. FusionNet service provider 320 also has the capability of obtaining and supplying the client information, and transferring the desired media information obtained from the selected media source to the client. Since the user is connected to the FusionNet service provider through as point-to-point dedicated connection, the advantages of using a QOS network as described above can be preserved.

The remaining steps in obtaining access to the selected media source proceed as described above with reference to FIGS. 1 and 2, with the FusionNet service provider 320 shown in FIG. 3 substituting in place of client 100 that is shown in FIGS. 1 and 2. Thus, whereas the client is the requesting party in the embodiment as shown in FIGS. 1 and 2, the FusionNet service provider becomes the requesting party (on behalf of the client) for access to a media source in the variation shown in FIG. 3.

In summary, an improved client-server architecture for access to distributed media sources locatable over the Internet has been described which utilizes the advantages of known QOS networks, such as the PSTN, to provide guaranteed quality of service, security, and a charge mechanism for handling such media access requests. The architecture has the advantage of allowing access to media sources that may be independent from the QOS network provider. Where necessary, the architecture may include a gateway for transferring the requested information from the media source to the client. A variation of the architecture provides for the client functionality to be included within a service provider so that a user may obtain the benefits of the FusionNet architecture while making only a single connection to the service provider.

What has been described is merely illustrative of the application of the principles of the present invention. Other arrangements and methods can be implemented by those skilled in the art without departing from the spirit and scope of the present invention.

What is claimed is:

1. A method of linking a requesting party to a selected media source locatable over a globally-accessible packet network in response to a client request, comprising the steps of:
   a. receiving information about the client and the selected media source at a first server of a plurality of servers over a first communications session established using the packet network, wherein each of the plurality of servers may be communicated with over the packet network;
   b. establishing a second communications session between the first server and the selected media source; and
   c. transferring information over the second communications session to cause the selected media source to transfer media information, subject to the control of the first server, to the requesting party over a third communications session established using a second network having at least one functional quality different from a functional quality of the packet network.

2. The method according to claim 1, wherein the requesting party is the client.

3. The method according to claim 1, wherein the packet network is the Internet.

4. The method according to claim 1, wherein the client information includes a communication number for use in establishing the third communications session with the requesting party.

5. The method according to claim 1, wherein the client information includes a login and password from which the first server determines a communication number for use in establishing the third communications session with the requesting party.

6. The method according to claim 1, wherein the client information includes an account number from which the first server determines a communication number for use in establishing the third communications session with the requesting party.

7. The method according to claim 1, wherein the client information includes a communication number for use in billing the client.

8. The method according to claim 1, wherein the client information includes a login and password from which the first server determines a communication number for use in billing the client.

9. The method according to claim 1, wherein the client information includes an account number from which the first server determines a communication number for use in billing the client.

10. The method according to claim 1, further comprising the step of before transferring information over the second communications session to cause the media source to transfer media information to the requesting party over the third communications session, interrogating the selected media source using the second communications session to determine the availability of the requested media information.

11. The method according to claim 1, wherein the third communications session is established among the first server, the requesting party, and the selected media source.

12. The method according to claim 11, wherein the third communications session is established using a modem.

13. The method according to claim 11, wherein the third communications session is established using an ISDN adapter.

14. The method according to claim 11, wherein the third communications session is established using a public switched telephone network.

15. The method according to claim 11, wherein the third communications session is established using a private telephone network.

16. The method according to claim 11, wherein the third communications session is established using a high speed data transmission link.

17. The method according to claim 11, wherein the third communications session is established using a cable network employed for video or television.

18. The method according to claim 11, further comprising the step of transferring additional client information from the requesting party to the first server over the third communications session for use in billing the client.

19. The method according to claim 18, wherein the additional client information includes an account number for use in billing the client.

20. The method according to claim 1, wherein the third communications session is established by linking each of the selected media source and the requesting party to a gateway.

21. The method according to claim 20, wherein as the media information is transferred from the selected media source to the requesting party the gateway performs at least one of the functions of converting the media information or reformatting the media information.

22. The method according to claim 1, wherein the selected media source is one of a plurality of media sources locatable over the packet network.

23. A system for linking a requesting party to a selected media source locatable over a globally-accessible packet network in response to a client request, comprising:
   a. a first server, of a plurality of servers that may be communicated with over the packet network, for communicating with the selected media source;
   b. a first interface for receiving client information at the first server over a first communications session established using the packet network; and
   c. a second interface for establishing a second communications session between the first server and the selected media source;
   wherein the first server causes the selected media source to transfer media information to the requesting party over a third communications session established using a second network having at least one functional quality different from a functional quality of the packet network.

24. The system according to claim 23, wherein the requesting party is the client.

25. The system according to claim 23, wherein the packet network is the Internet.

26. The system according to claim 23, wherein the first interface includes a mechanism used to transmit information according to the Internet Protocol.

27. The system according to claim 23, wherein the first interface includes means responsive to the client request for identifying the selected media source in order to establish the communications session between the first server and the selected media source.

28. The system according to claim 23, further comprising a third interface for establishing a communications session among the requesting party, the first server, and the selected media source.

29. The system according to claim 28, wherein the third interface includes a mechanism used to establish communications session employing a public switched telephone network.

30. The system according to claim 28, wherein the third interface includes a mechanism used to establish a communications session employing a private telephone network.

31. The system according to claim 28, wherein the third interface includes a mechanism used to establish a communications session employing a high speed data transmission link.

32. The system according to claim 28, wherein the third interface includes a mechanism used to establish a communications session through a cable network employed for video or television.

33. The system according to claim 28, wherein the third interface includes a modem.

34. The system according to claim 28, wherein the third interface includes an ISDN adapter.

35. The system according to claim 23, further comprising a gateway for linking the requesting party and the selected media source.

36. The system according to claim 35, wherein as the media information is transferred from the selected media source to the requesting party the gateway performs at least one of the functions of converting the media information or reformatting the media information.

37. The system according to claim 21, wherein the selected media source is one of a plurality of media sources locatable over the packet network.

38. A method of linking a client to a selected one of a plurality of distributed media sources that may be communicated with over a globally-accessible packet network in response to a client request, comprising:

a. receiving information about the client and about media information desired by the client at a server over a first communication session using the globally-accessible packet network;

b. determining the availability of the desired media information at the selected media source;

c. establishing a second communications session between the server and the selected media source; and d. transferring information over the second communications session to cause the selected media source to transfer the desired media information, subject to the control of the server, to the client over a third communications session established using a second network having at least one functional quality different from a functional quality of the globally-accessible packet network.

39. The method according to claim 38, wherein the third communications session is established by linking each of the selected media source and the requesting party to a gateway.

40. The method according to claim 39, wherein as the media information is transferred from the selected media source to the requesting party the gateway performs at least one of the functions of converting the media information or reformatting the media information.

41. A system for linking a client to one of a plurality of distributed media sources that may be communicated with over a globally-accessible packet network in response to a client request, comprising:

a. a server capable of communicating with the globally-accessible packet network, for communicating with the plurality of media sources;

b. a first interface for receiving client information and about media information desired by the client at the server over a first communications session established using the globally-accessible packet network; and c. a second interface for establishing a second communications session between the server and a selected one of the plurality of media sources; wherein the server determines the availability of the desired media information at one of the plurality of media sources, selects the media source having the desired media information, and causes the selected media source to transfer the desired media information to the client over a third communications session established using a second network having at least one functional quality different from a functional quality of the globally accessible packet network.

42. The system according to claim 41, further comprising a gateway for linking the requesting party and the selected media source.

43. The system according to claim 42, wherein as the media information is transferred from the selected media source to the requesting party the gateway performs at least one of the functions of converting the media information or reformatting the media information.

* * * * *